Dec. 25, 1945.     G. F. N. OLIVER     2,391,795
ADJUSTABLE BRACKET
Filed June 1, 1943     2 Sheets-Sheet 1
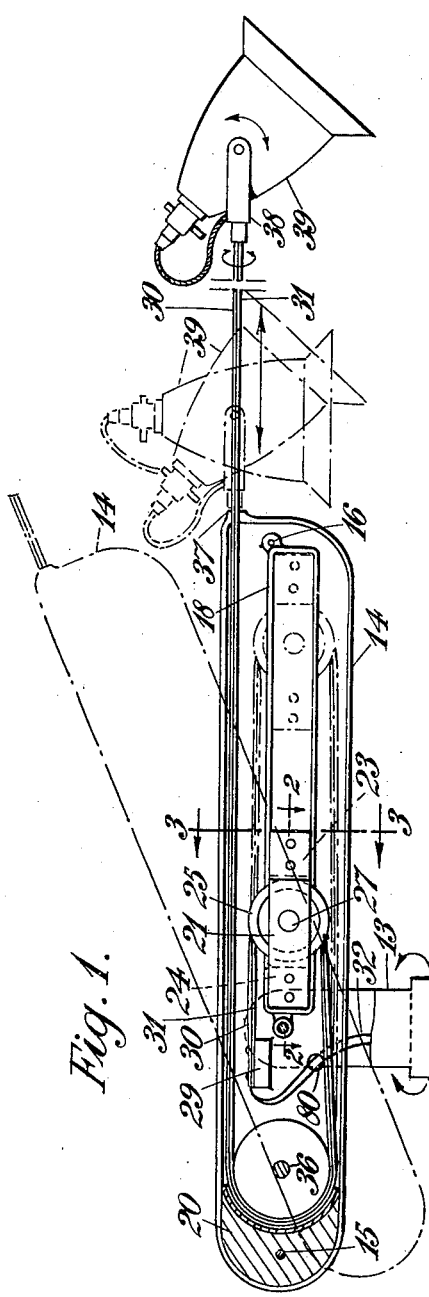
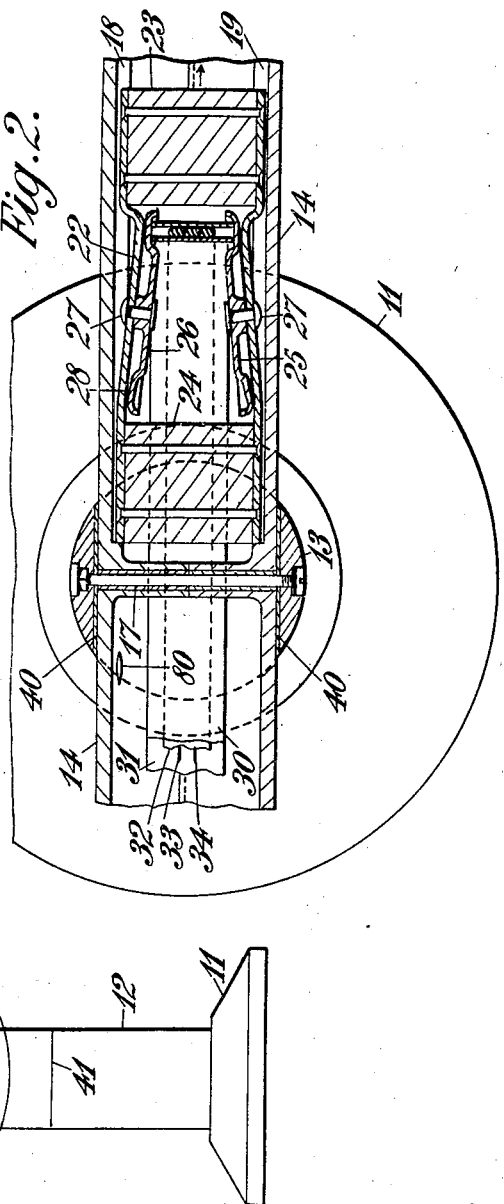
Inventor,
G. F. N. Oliver
By
Young, Emery & Thompson
Attorneys Dec. 25, 1945.  G. F. N. OLIVER  2,391,795
ADJUSTABLE BRACKET
Filed June 1, 1943  2 Sheets-Sheet 2
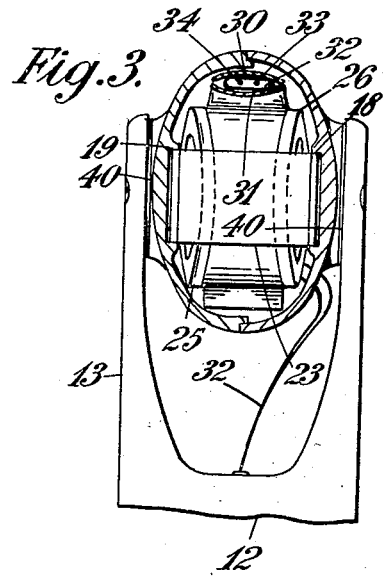
Inventor,
G. F. N. Oliver
By Young, Emery & Thompson
Attorneys Patented Dec. 25, 1945

2,391,795

UNITED STATES PATENT OFFICE 2,391,795

ADJUSTABLE BRACKET

George Francis Norris Oliver, London, England, assignor to Oliver Pell Control Limited, Woolwich, London, England, a British company Application June 1, 1943, Serial No. 489,271
In Great Britain April 10, 1942

1 Claim. (Cl. 248—123)

This invention comprises improvements in or relating to adjustable brackets.

It is an object of the invention to provide a bracket which is suitable for carrying an object, such for example as an electric lamp, a telephone instrument or other articles, and which can be readily adjusted into any desired position, in which it will remain. Adjustable lamp and telephone brackets are known, but have various disadvantages such as complication of construction and lack of balance in various positions of adjustment.

In United States Patent application Serial No. 439,913 there is described an adjustable bracket consisting of a flexible concave-convex strip of material, one end of which is fixed to a hub and the other end of which is slidably supported on a bearing surface carried by the hub, the strip being bent intermediately between the end portions, so that the slidable portion can be moved in or out over the bearing surface, the bend in the strip floating along the strip during its operation, and the present invention relates to a bracket of this type. It is possible to substitute for such a strip a chain composed of links such that it will bend from a straight line in one direction but not in the other such as the chain in common use for operating car windscreens.

The present invention consists in an adjustable bracket (for carrying an object of the kind described) and comprising a flexible strip (or chain), fixed at one end, connected at the other to the object to be supported either directly or through an extension and having intermediately a floating bend so that the strip, chain or an extension is capable of being slid in or out over a supporting bearing surface, the construction being such that the strip or chain is bent intermediately between its ends at at least two places and the bends are so guided that if the strip or chain is slid out at least one of the bends is moved oppositely and wherein a weight is located on the bend which is thus moved so as to balance the lamp in all positions.

In one construction the bent portions of the flexible strip or chain are located within a casing which carries the bearing surface to support the strip or chain where it is slid out of the casing and the casing is provided with a hub pivotally mounted on a support and is so counterweighted that, in conjunction with the weight attached to the movable bend, the casing is in substantial balance at all positions of the strip. Thus when the bracket is adjusted by drawing out the flexible strip or chain and thereby increasing the moment of the weight of the article carried by the bracket about the pivotal support of the casing, the weight which is attached to the bend within the casing is drawn toward the hub and offsets the increased leverage. Owing to this compensation the forces tending to rotate the hub of the bracket are constant in all positions of adjustment, or at all events more nearly constant than would be the case if the bracket were not thus compensated. In this way it becomes possible for a bracket to be constructed which will remain in any desired position of adjustment within its capacity without necessitating undue friction means at the hub to keep it in its position.

The invention is not limited to the case where the bracket comprises a pivoted hub as the compensating feature is also useful in other connections as hereinafter described.

The following is a description, by way of example, of certain constructions in accordance with the invention, reference being made to the accompanying drawings in which:

Figure 1 is a side elevation partly in vertical section of a lamp bracket in accordance with the invention.

Figure 2 is a horizontal section upon the line 2—2 of Figure 1, looking in the direction of the arrows.

Figure 3 is a vertical section upon the line 3—3 of Figure 1, looking in the direction of the arrows.

Referring to Figures 1, 2 and 3, 11 represents a moulded base supporting a column 12 with a forked upper end 13 and between the arms of the fork there is pivoted a casing 14. The casing 14 is of oval section made in two halves fitting together upon a vertical central plane and united together by screws 15, 16 at the ends, and at 17, the latter passing through the pivot point and the arms of the fork 13. Within the casing there are guides 18, 19 which are moulded in the interior of the walls of the casing and extend along the greater part of the internal length between the pivot to the fork 13 and one of the outer ends of the casing. In the portion of the casing which projects from the pivot point on the opposite side to the guides 18, 19 there is a fixed counterweight 20. In the guides there slides a movable counterweight constituted by bent side members 21, 22 the ends of which fit in the guides 18, 19 and metal blocks 23, 24 riveted between the side members. In the space between the metal blocks 23, 24 there are pivoted pressed metal guide pulleys 25, 26 secured to the side members 21, 22 by means of rivets 27. The side members 21, 22 are bent so as to be inclined to the length of the bracket casing at the part where they carry the guide pulleys 25, 26 and thus the guide pulleys are nearer to one another on the side which is remote from the pivot 17 than they are on the side which is nearer to the pivot. The edges of the guide pulleys are annularly recessed as shown at 28.

Within the casing 14 there is a block 29 (Figure 1) which is carried by one of the side members of the casing and on this there is riveted a flexible metal strip consisting of two concave steel tapes 30, 31 which are placed together with their concave faces towards one another and which support between them a flat rubber strip 32 containing flexible electrical conductors 33, 34, as seen in Figures 2 and 3. Each of the concave strips may be laminated, i. e. consist of more than one thickness of steel strip so as to give increased strength if required. The flexible tapes 30, 31 extend from the block 29 toward the inclined guide pulleys 25, 26 and pass around the annular edges 28 of the guide pulleys on the side where they are nearest together, that is to say the side remote from the pivot 17 and thence back in the casing below the pivot and round a fixed guide pulley 35 pivoted at 36 in the casing close to the counterweight 20. From here the tapes pass along the upper side of the casing 14 and out through an opening 37 in the end thereof to a fork 38 which supports a lamp fitting 39.

In the operation of this adjustable lamp bracket the lamp 39 can be raised or lowered by tilting the casing 14 about the pivot 17 to any desired extent and the casing being balanced about the pivot 17, tends to remain in any desired position of adjustment owing to the friction between the sides of the fork and the sides of the casing 14. The firmness of the grip may be assisted by friction washers 40.

If it is desired to move the lamp laterally the upper portion of the column 12 may be mounted to rotate in the lower portion, the two parts being separated as indicated by line 41. To move the lamp 39 further from the column 12 or nearer to it the steel tapes 30, 31 can be drawn out through the opening 37. Drawing out the lamp 39 draws the tape around the fixed pulley 35 and causes the bend in the tape where it passes round the pulleys 25, 26 to move inwards toward the pivot 17, carrying the pulleys and the weights 23, 24 with it. Thus the more the lamp 39 is drawn out the more the weights 23, 24 are drawn in and balance is maintained. The counterweight 20 needs, of course, to be heavy enough to maintain the general balance of the casing and the weights 23, 24 to be such as to compensate for the variation of leverage of the weight of the lamp 39. It will be appreciated that the curved tapes 30, 31 in passing around the pulleys 25, 26 and also around the pulley 35 become flattened, as shown in the cross section of Figure 2, but they resume the curved form when the tapes are straightened and being curved towards one another they enclose the rubber flexible connection 32 through which the electric wires pass to the lamp 39.

The end portion of the bracket supporting the lamp 39 instead of being constituted by the end of the spring tapes 30, 31 may consist of a length of tube or the like attached to the tapes and forming an extension of them. The flat rubber strip 32 containing the conductors 33, 34 emerges from between the end of the steel tapes 30, 31 by the block 29 and can either be led as shown through an opening 80 in the casing 14 or the pivot 17 can be subdivided and the two parts used as terminals and connections taken down through the interior of the sides of the fork 13. If the pivot pin 17 is divided in this way, the space between its inner portions can be made adequate to permit the weight 24 to pass the pivot and thus to extend the range of movement of the lamp.

I claim:

In an adjustable bracket the combination of a support, a casing having a hub pivotally mounted upon the support, a bracket arm consisting of an element, part at least of which is bendable but is capable when straightened of resisting bending in at least one direction, the said element being mounted within the casing and projecting therefrom over a bearing surface afforded by a portion of the casing so as to be capable of being drawn out therefrom and returned thereto, said bracket arm being bent through 180° in two places within the casing and its end within the casing being fixed relatively thereto, a weight mounted for sliding movement within the casing and engaged with the second bend, that is the one nearer the fixed end of the bracket arm, the casing being balanced and the amount of the movable weight such that the balance of the casing about the hub is maintained in all positions of the bracket arm.

GEORGE FRANCIS NORRIS OLIVER.